Oct. 13, 1931.  B. BODEREK  1,827,350
CHILD'S VEHICLE
Filed Aug. 9, 1930
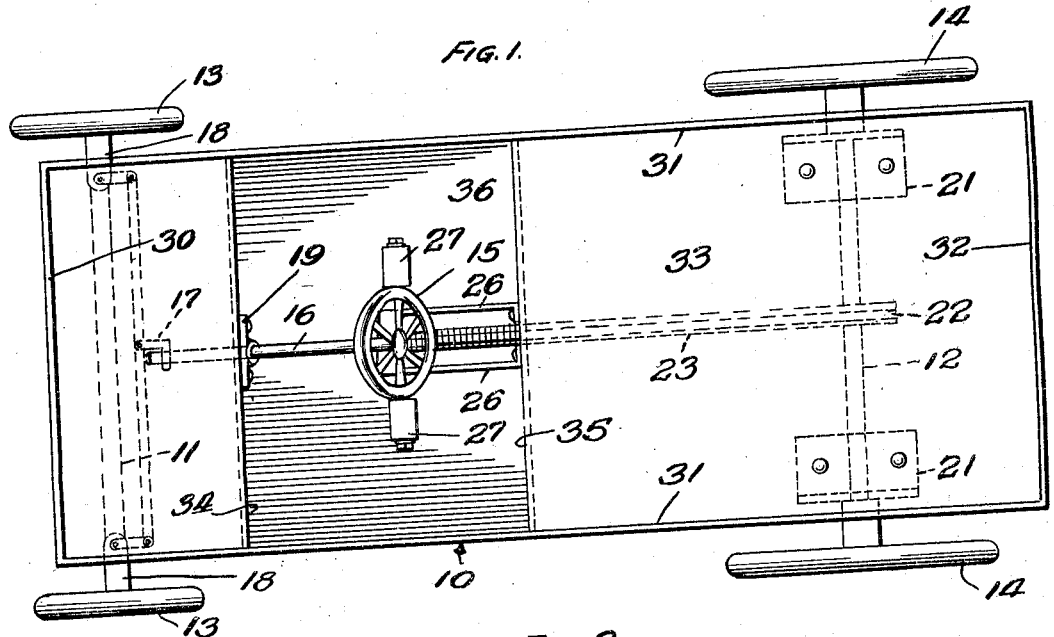
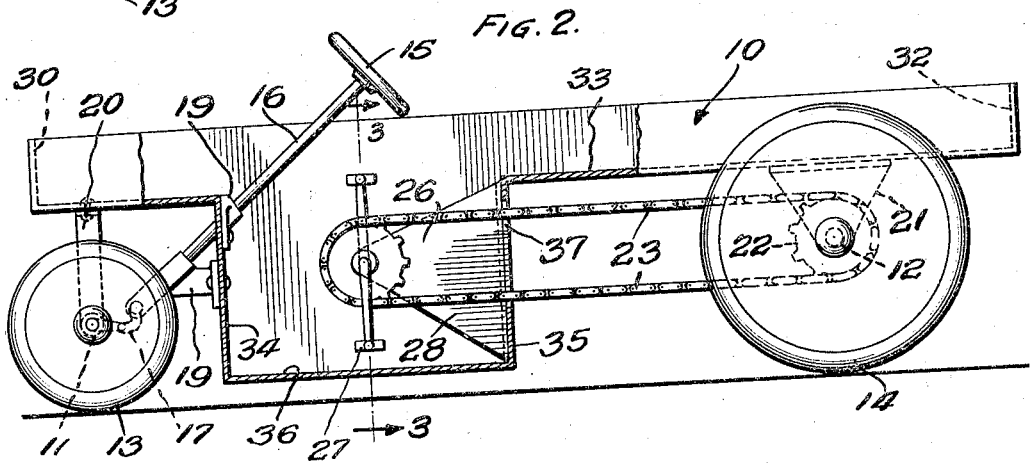
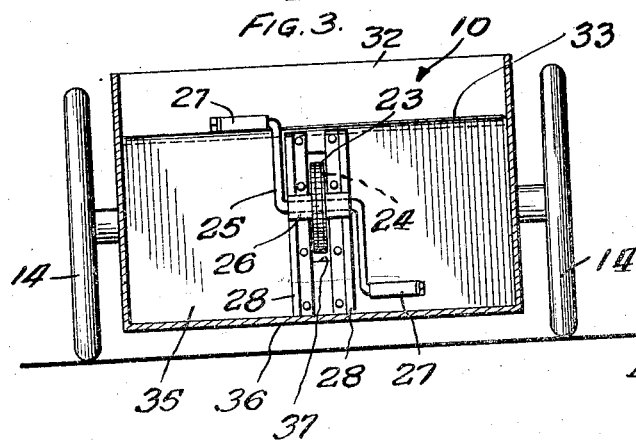
INVENTOR
B. BODEREK
BY B. Pelechowicz
ATTY.

Patented Oct. 13, 1931

1,827,350

UNITED STATES PATENT OFFICE

BRUNO BODEREK, OF CHICAGO, ILLINOIS

CHILD'S VEHICLE

Application filed August 9, 1930. Serial No. 474,248.

My invention relates to riding devices and is more particularly concerned with the provision of a manually propelled vehicle of an improved construction.

One of the objects of my invention is to provide a pedally operated vehicle of this type which has enclosures below the pedals and which is enclosed on the sides so that children using the vehicle will not be injured by extending their feet to the ground, or by any usual side or end collision such as frequently occur to children while at play.

Another object of the invention is to provide a vehicle of this type that is sturdy and strongly built yet fairly light and easily propelled.

Other objects and advantages will be more apparent from the following description reference being had to the accompanying drawings, in which Fig. 1 is a plan view of my improved vehicle. Fig. 2 is a side view thereof with parts broken away in section to show other parts; and Fig. 3 is a vertical sectional view taken on the line 3—3 of Fig. 2 and looking in the direction of the arrows.

As shown in the drawings, my improved vehicle comprises a body 10 supported above front and rear axles 11 and 12 upon which front and rear wheels 13 and 14 respectively are mounted. For guiding the vehicle, a steering wheel 15 is provided and a steering column 16 extending downwardly through body 10 and operatively attached thru suitable mechanism 17 to the front wheel spindles 18. Brackets 19 attached to either side of a wall of the body rigidly support the steering column in position. The front axle is rigidly attached to the bottom of body 10 by brackets 20.

Rear axle 12 is rotatably carried below the bottom wall of body 10 by a pair of bearings 21 attached to the body 10 by riveting or in any other suitable manner.

A sprocket wheel 22 is fixedly mounted on rear axle 12, having sprocket chain 23 trained thereupon and extending from another sprocket wheel 24 rigidly mounted upon a crank-shaft 25. Crank shaft 25 is journalled in bearings 26 and carries the foot pedals 27 freely mounted upon extensions thereof.

Bearings 26 as will be noted have widely extended flanges 28 securely fixed to a wall of the body 10 to firmly support the crankshaft 25 in position, and also to form a shield or guard on the sides of the chain 23 and sprocket wheel 24, thus preventing children from carelessly getting their foot or any portion thereof, or of their clothes into the sprocket or chain.

The body construction will now be described. The body 10 may be of the usual generally rectangular shape of bodies for vehicles of the type described, having a front wall 30, side walls 31, rear wall 32 and a bottom wall 33. The bottom wall may have a pair of depending wall portions 34 and 35, and a lower horizontal wall portion 36 below the sprocket 24 and pedals 27. An opening 37 is provided in wall 35, thru which the sprocket chain 23 passes.

It will be noted that side walls 31 extend downwardly to the lower horizontal wall portion 36, thus completely enclosing the boxlike compartment in which the foot-pedals are mounted.

By the arrangements shown it will be seen that a child propelling the vehicle can not get his feet onto the ground either to slide them, thus wearing out his shoes or to stub his toes against objects on the ground, thereby overturning the vehicle and injuring himself.

It will also be apparent that room is provided in the body 10 to carry a load if desirable or other children may be seated to the rear of the operator.

While I have illustrated and described a specific embodiment of my invention, it will be apparent that many changes and modifications may be made without departing from the spirit of my invention and I do not wish to be limited in any particular, rather, what I claim and desire to secure by Letters Patent of the United States is:

1. A pedally operable child's vehicle including front and rear axles, a body, a downwardly extending compartment in said body, a crank shaft and sprocket wheel therein, bearings for said crank shaft mounted at the rear wall of said compartment, said bearings constituting guards on both sides of said sprocket wheel, a sprocket wheel on said rear axle, and a sprocket chain connecting both of said sprocket wheels, the rear wall of said compartment having an opening at a point between said bearings for permitting passage of said sprocket chain.

2. A pedally operable child's vehicle including front and rear axles, a body, a downwardly extending compartment in said body, a crank shaft and sprocket wheel therein, bearings for said crank shaft mounted at the rear wall of said compartment, said bearing constituting guards on both sides of said sprocket wheel, a sprocket wheel on said rear axle, both of said sprocket wheels being substantially on the same horizontal plane, and a sprocket chain connecting both of said sprocket wheels, the rear wall of said compartment having an opening at a point between said bearings for permitting passage of said sprocket chain.

3. A pedally operable child's vehicle including front and rear axles, a body, a downwardly extending compartment in said body, the bottom wall of said compartment being on a plane below the plane of either of said axles, a crank shaft and sprocket wheel within said compartment, bearings for said crank shaft mounted at the rear wall of said compartment, said bearings constituting guards on both sides of said sprocket wheel, a sprocket wheel on said rear axle, both of said sprocket wheels being on substantially the same horizontal plane, and a sprocket chain connecting both of said sprocket wheels, the rear wall of said compartment having an opening at a point between said bearings for permitting passage of said sprocket chain.

In testimony whereof I affix my signature.

BRUNO BODEREK.